US011420172B2

(12) United States Patent
Turner (10) Patent No.: US 11,420,172 B2
(45) Date of Patent: Aug. 23, 2022

(54) JACKETED VESSEL (71) Applicant: Hargrove and Associates, Inc., Mobile, AL (US)

(72) Inventor: Benjamin Turner, Roswell, GA (US)

(73) Assignee: Hargrove and Associates, Inc., Mobile, AL (US)

( * ) Notice: Subject to any disclaimer, the term of this patent is extended or adjusted under 35 U.S.C. 154(b) by 0 days.

(21) Appl. No.: 16/771,575

(22) PCT Filed: Feb. 15, 2019

(86) PCT No.: PCT/US2019/018170
§ 371 (c)(1),
(2) Date: Jun. 10, 2020

(87) PCT Pub. No.: WO2020/167313
PCT Pub. Date: Aug. 20, 2020

(65) Prior Publication Data
US 2021/0362119 A1  Nov. 25, 2021

(51) Int. Cl.
*B01J 19/00* (2006.01)
*B01J 14/00* (2006.01)
(Continued)

(52) U.S. Cl.
CPC .......... *B01J 19/0013* (2013.01); *B01J 14/00* (2013.01); *B01J 19/0053* (2013.01);
(Continued)

(58) Field of Classification Search
CPC .... B01J 19/0053; B01J 19/0013; B01J 19/24; B01J 14/00; B01J 2219/00094; F28D 1/06
See application file for complete search history.

(56) References Cited

U.S. PATENT DOCUMENTS

| 3,318,376 A | * | 5/1967 | Vihl | B21D 53/02 165/169 |
| 3,452,568 A | * | 7/1969 | Vihl | B21D 5/08 72/137 |

(Continued)

FOREIGN PATENT DOCUMENTS

WO   2008088371 A2   7/2008

OTHER PUBLICATIONS

International Search Report, dated Nov. 14, 2019, for Appl. No. PCT/US19/18170, filed Feb. 15, 2019.
(Continued)

*Primary Examiner* — Lessanework Seifu
(74) *Attorney, Agent, or Firm* — AdamsIP, LLC; Stephen Thompson; J. Hunter Adams (57) ABSTRACT

A jacketed vessel for temperature control of contents within the vessel is provided. The vessel has a shell and an external jacket through which heating or cooling fluid is circulated. The jacket is formed by a length of conduit arranged in a spiral orientation around the vessel shell. The conduit has a center portion having a concave inner surface and has opposing side portions having convex inner surfaces. Edge sections of each side portion are welded to the exterior surface of the shell to form the jacket. Edge sections of adjacent arcs of conduit may be simultaneously welded to the shell in a single weld pass. The shape of the conduit provides improved heat transfer and pressure drop characteristics, as well as improvements in the vessel manufacturing process.

16 Claims, 6 Drawing Sheets

(51) Int. Cl.
 *F28D 1/06* (2006.01)
 *B23K 9/00* (2006.01)
 *B23K 9/032* (2006.01)
 *B23K 101/12* (2006.01)

(52) U.S. Cl.
 CPC .......... *B23K 9/0061* (2013.01); *B23K 9/0325* (2013.01); *F28D 1/06* (2013.01); *B01J 2219/00094* (2013.01); *B23K 2101/12* (2018.08)

(56) References Cited

U.S. PATENT DOCUMENTS

| | | | |
|---|---|---|---|
| 4,205,720 A * | 6/1980 | Epstein | F28D 1/06 165/169 |
| 8,003,059 B2 | 8/2011 | Jachuck et al. | |
| 8,293,064 B2 | 10/2012 | Chang et al. | |
| 9,534,196 B2 | 1/2017 | Galliher et al. | |
| 2009/0134173 A1 | 5/2009 | Liang et al. | |
| 2016/0016267 A1* | 1/2016 | Beatty | B23K 37/0452 29/559 |

OTHER PUBLICATIONS

Written Opinion of the International Searching Authority, dated Nov. 14, 2019, for Appl. No. PCT/US19/18170, filed Feb. 15, 2019.

\* cited by examiner

JACKETED VESSEL

CROSS REFERENCES

This application is a United States National Stage Application of PCT/US19/18170, filed Feb. 15, 2019, which application is incorporated herein by reference.

FIELD OF THE INVENTION

The present disclosure refers generally to a jacketed vessel for temperature control of contents within the vessel and to a method of manufacturing a jacketed vessel for temperature control of contents within the vessel.

BACKGROUND

Jacketed vessels are commonly used in chemical processes requiring temperature control of the contents of a vessel. For instance, jacketed reactor vessels may be utilized as batch or continuous reactor vessels when a reaction process requires heating or cooling of process fluids inside the vessel. The jacket is disposed around the exterior of the vessel and provides a conduit through which heating or cooling fluid may be circulated to facilitate heat transfer between the heating or cooling fluid and the walls of the vessel. Though internal coils may also be utilized as a conduit for heating or cooling fluids used to control vessel temperature, a jacketed vessel may be advantageous in processes involving highly corrosive or highly reactive materials since the jacket is external to the process fluids contained within the vessel. An external jacket may also reduce the risk of contamination due to heating or cooling fluid mixing with process fluids due to leaks in internal coils.

Common types of jackets used in jacketed vessels include conventional jackets, dimple jackets, and half-pipe jackets. A conventional jacket comprises a second, external shell that covers at least a portion of the shell of the vessel and provides a space through which heating or cooling fluid may be circulated. A conventional jacket is simple to construct but is generally inefficient for heat transfer due to flow characteristics of the heating or cooling fluid inside the jacket. A dimple jacket has dimples that impart turbulence to the heating or cooling fluid as it flows inside the jacket. A half-pipe jacket comprises conduit formed by splitting pipe lengthwise, typically at an angle of 180 degrees (evenly down the middle of the pipe) or 120 degrees, or by bending a flat plate into a half-pipe shape. The conduit, or "half-pipe", is then positioned around the exterior of the vessel shell in a spiral orientation and welded to the shell to form a spiraling passageway through which heating or cooling fluid is circulated. Half-pipe jackets provide good heat transfer and may be preferred for high-temperature applications. Half-pipe jackets may also be divided into multi-pass zones, which cover different sections of the vessel and generally provide for greater flexibility in heating or cooling.

However, there are a number of problems with existing half-pipe jacket designs. For instance, a limited surface area of the exterior surface of the vessel wall is covered by a conventional half-pipe jacket due to spacing between adjacent passes, or arcs, of the half-pipe jacket. A certain amount of spacing between adjacent arcs is generally required to provide clearance for welding each arc of the half-pipe to the vessel shell during the manufacturing process. In addition, a significant amount of welding is required to attach the half-pipe to the exterior of the vessel shell in a spiral orientation. To manufacture a conventional half-pipe jacketed vessel, the half-pipe conduit is positioned adjacent to the vessel shell with each side of the half-pipe abutting the shell. Each side of the half-pipe is then individually welded to the vessel shell, typically utilizing a continuous fillet welding joint, to join each of the two sides of the half-pipe to the vessel shell along the length of the half-pipe. Thus, each side of the half-pipe requires at least one weld pass to join the half-pipe to the shell. In some cases, a second weld pass may be performed on each side of the half-pipe in order to provide additional strength in the weld joint and minimize the risk of cracking at the joint. Thus, at least two weld passes (one for each side of the half-pipe) are required to weld a length of half-pipe jacket to a vessel shell, and sometimes as many as four weld passes may be performed. Accordingly, the manufacturing process requires significant welding to the exterior of the vessel shell, and the required amount of welding can cause mechanical concerns when thermal cycling occurs. In addition, the intensive welding process increases the cost of manufacturing half-pipe jacketed vessels and may account for as much as thirty percent of the cost of manufacturing a vessel. An additional issue of concern with half-pipe jacketed vessels is pressure drop of the heating or cooling fluid that is circulated inside the half-pipe, which may be significant in conventional half-pipe designs.

Accordingly, there is a need in the art for a half-pipe jacketed vessel having a greater heat transfer surface area, improved pressure drop and heat transfer characteristics, and greater structural stability as compared to conventional half-pipe designs. Additionally, there is a need in the art for a method of manufacturing such a half-pipe jacketed vessel that minimizes the welding required and reduces manufacturing costs.

SUMMARY

In one aspect, a jacketed vessel for temperature control of contents within the vessel and a method of manufacturing the vessel are provided. The vessel comprises a vessel shell having an exterior surface and an external jacket comprising a length of conduit integrally attached to the exterior surface of the shell and disposed in a spiral orientation around the shell. Heating or cooling fluid may be circulated through the conduit so that the heating or cooling fluid contacts the exterior surface of the shell to cause heat transfer between the heating or cooling fluid and the walls of the vessel. The conduit has a center portion that extends lengthwise along the length of the conduit and that has a concave inner surface. The center portion preferably has a cross-sectional shape of a circular segment. The conduit also has two opposing side portions each integrally formed lengthwise with the center portion and each having a convex inner surface that is continuous with the concave inner surface of the center portion. Thus, the opposing side portions spread outwardly from the center portion so that a transverse cross-section of the conduit has a shape similar to the shape of a bell curve. The opposing side portions include two opposing edge sections along the length of the conduit at the edges of the side portions. The edge sections are integrally attached to the exterior surface of the shell, preferably by a welding joint, to form the attachment of the jacket conduit to the vessel shell. Once attached, the concave and convex inner surfaces of the conduit and the exterior surface of the shell form a passageway that is enclosed along the length of the conduit. The passageway is open at two opposing ends to allow heating or cooling fluid to flow through the passageway for temperature control of the vessel contents.

Due to the cross-sectional shape of the jacket conduit, the convex inner surface of each side portion may be tangential to the exterior surface of the shell when the conduit is attached to the vessel shell. This cross-sectional geometry of the conduit provides a larger surface area for heat transfer between the heating or cooling fluid and the walls of the vessel for each pass of the spirally oriented jacket conduit, as well as a larger cross-sectional area of the passageway formed by the conduit and the vessel shell, as compared to a conventional half-pipe jacket having conduit of the same internal diameter. This design of jacket conduit results in improved pressure drop characteristics of the heating or cooling fluid circulating through the jacket and improved heat transfer and temperature control. In addition, the cross-sectional geometry of the conduit may eliminate structural discontinuities, or notches, which may impart increased fatigue resistance.

During the manufacturing process of the present jacketed vessel, the jacket conduit is welded to the exterior surface of the vessel shell. Before welding, the edge sections of the conduit abut and generally lay flat against the exterior surface of the shell due to the shape of the conduit with the side portions spreading outwardly from the center portion. This cross-sectional geometry allows an edge section on one side of an arc of conduit to be positioned adjacent to and in the same plane as an edge section on an opposing side of an adjacent arc of conduit when the adjacent edge sections are in a position abutting the exterior surface of the vessel shell. When in the same plane, a welding joint formed by a single pass, full-penetration butt weld may be utilized to join the adjacent edge sections of adjacent arcs of conduit to the vessel shell and to each other. Thus, a single welding joint may be utilized to join two edge sections of conduit to the vessel shell in a single pass, rather than requiring two or more weld passes to separately join two edges of conduit to a vessel shell. In addition, the cross-sectional geometry of the present jacket conduit provides spacing between center portions of adjacent arcs of conduit, which provides clearance necessary for performing a single pass butt weld to join edge sections of adjacent arcs of conduit to the shell.

The present manufacturing process provides a number of advantages in terms of manufacturing costs, vessel reliability, and vessel performance. This process significantly reduces the required amount of welding, which reduces production costs. A full-penetration butt weld generally provides higher joint efficiency and increased fatigue resistance of the jacket-to-shell weld as it reduces the possibility of a stress riser from a notch discontinuity. In addition, the cross-sectional geometry of the jacket conduit provides the ability to perform 100% radiography or ultrasonic inspections of the welding joint.

The foregoing summary has outlined some features of the device of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purposes of the device disclosed herein. Those skilled in the pertinent art should also realize that such equivalent designs or modifications do not depart from the scope of the device of the present disclosure.

DESCRIPTION OF THE DRAWINGS

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention as claimed. In the present disclosure, many features are described as being optional, e.g. through the use of the verb "may". For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features, or with all three of the three possible features. It is to be understood that the disclosure in this specification includes all possible combinations of such particular features. For example, where a particular feature is disclosed in the context of a particular aspect or embodiment, or a particular claim, that feature can also be used, to the extent possible, in combination with/or in the context of other particular aspects or embodiments, and generally in the invention as claimed.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The present invention provides a jacketed vessel for temperature control of contents within the vessel and a method of manufacturing a jacketed vessel for temperature control of contents within the vessel in accordance with the independent claims. Preferred embodiments of the invention are reflected in the dependent claims. The claimed invention can be better understood in view of the embodiments described and illustrated in the present disclosure, viz. in the present specification and drawings. In general, the present disclosure reflects preferred embodiments of the invention. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the invention per se.

Figure 1:
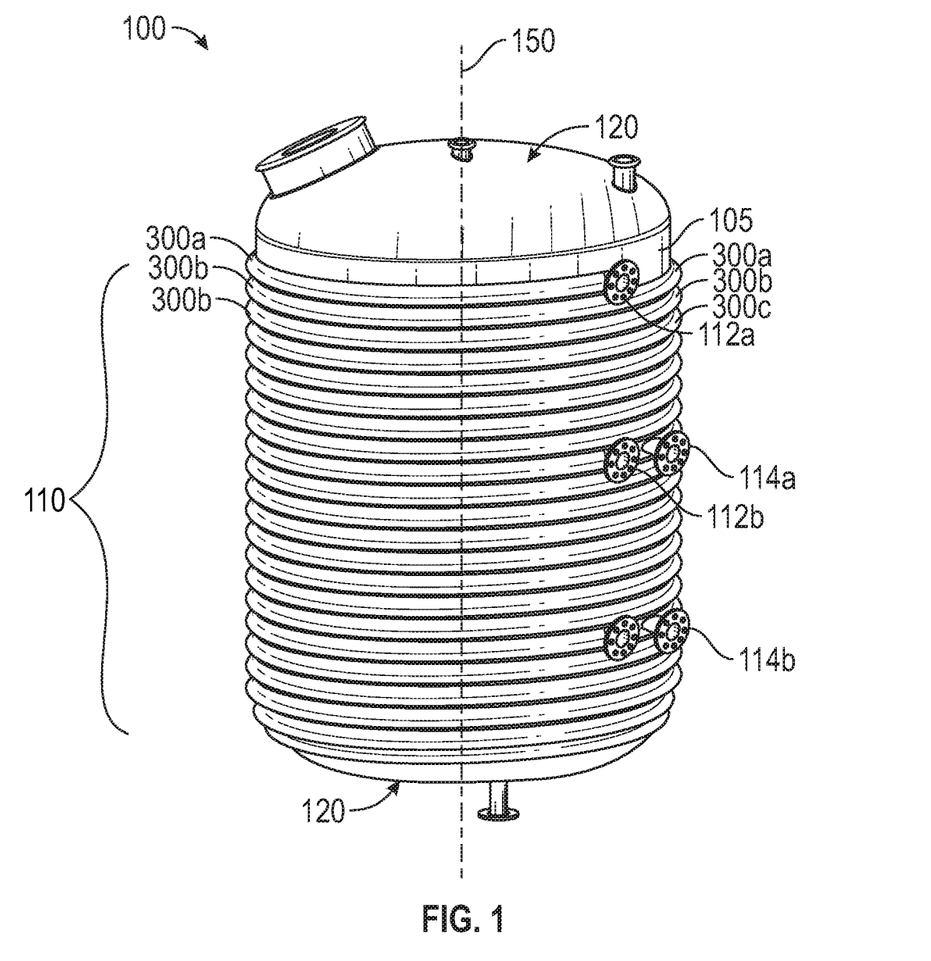
FIG. 1 is a perspective view of a jacketed vessel in accordance with the present disclosure.
Figure 2:
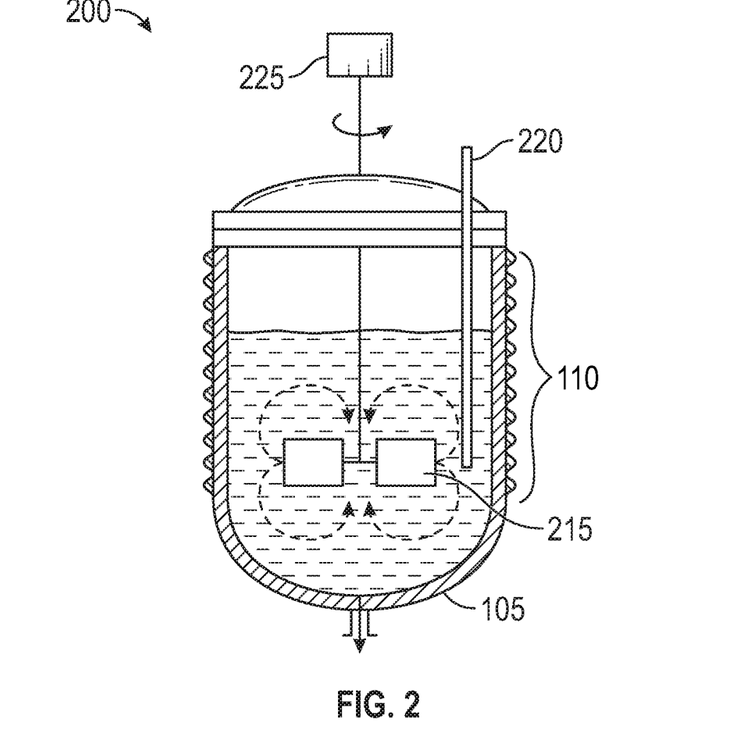
FIG. 2 is a cross sectional view of a jacketed vessel in accordance with the present disclosure.

A jacketed vessel 100 for temperature control of contents within the vessel is provided. FIG. 1 shows an illustrative vessel 100 having a jacket 110 in accordance with the present disclosure. The vessel 100 may be used as a temperature-controlled continuous or batch reactor, or alternatively as a temperature-controlled storage vessel, depending on the application. As shown in FIG. 1, the vessel 100 may have a generally cylindrical shape with a torispherical head 120 at each end. Alternatively, the vessel 100 may have hemispherical, ellipsoidal, flat, or conical heads. FIG. 1 illustrates the jacket 110 positioned around only the cylindrical side wall of the vessel 100, though the jacket may optionally be positioned on the heads 120 of the vessel 100 in addition to the side wall, depending on the design specifications of the vessel. In addition, the vessel shell may alternatively have a spherical shape. FIG. 2 shows an alternative vessel design, which may be a batch reactor 200, having a jacket 110 in accordance with the present disclosure. FIG. 2 shows a cross-sectional view of the vessel and jacket 110 through which heating or cooling fluid may be circulated around the exterior of the vessel shell 105. In addition, the batch reactor 200 has a feed line 220 and a motor 225 and agitator assembly 215 for stirring the contents of the vessel. Other vessel geometries and configurations may be utilized in accordance with the present disclosure.

The vessel 100 comprises a shell 105 having an exterior surface 340 and an external jacket 110. The jacket 110 comprises a length 302 of conduit 300 integrally attached to the exterior surface 340 of the shell 105 and disposed in a spiral orientation around the shell 105 relative to an axis 150 of the shell. The spiral arrangement of the jacket conduit 300 may optionally include additional arcs of conduit disposed on an external surface of the vessel heads. Heating or cooling fluid may be circulated through the conduit 300 so that the heating or cooling fluid contacts the exterior surface 340 of the shell 105 to cause heat transfer between the heating or cooling fluid and the walls of the vessel shell 105.

Figure 3:
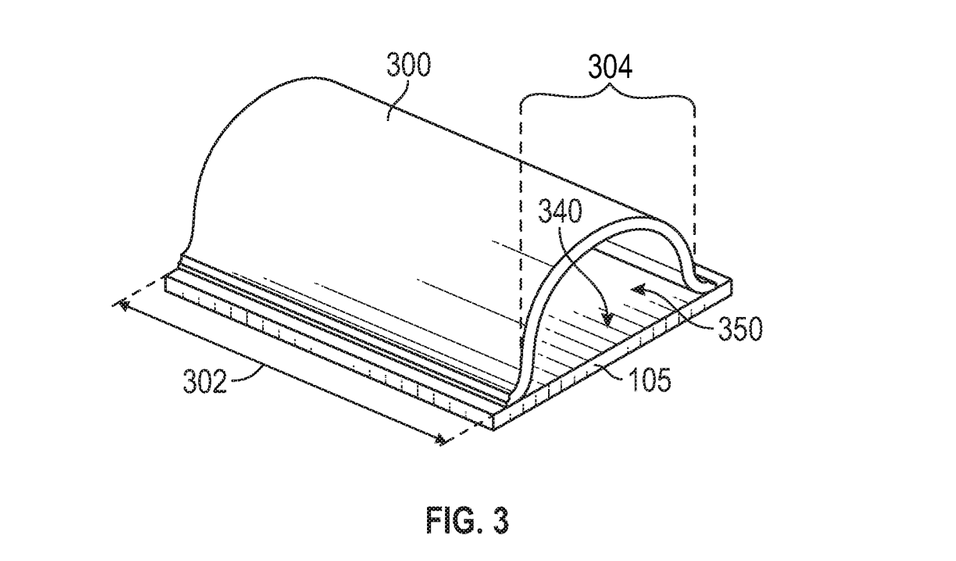
FIG. 3 is a partial perspective view of a length of conduit positioned abutting a vessel shell prior to attachment to the shell in accordance with the present disclosure.
Figure 4:
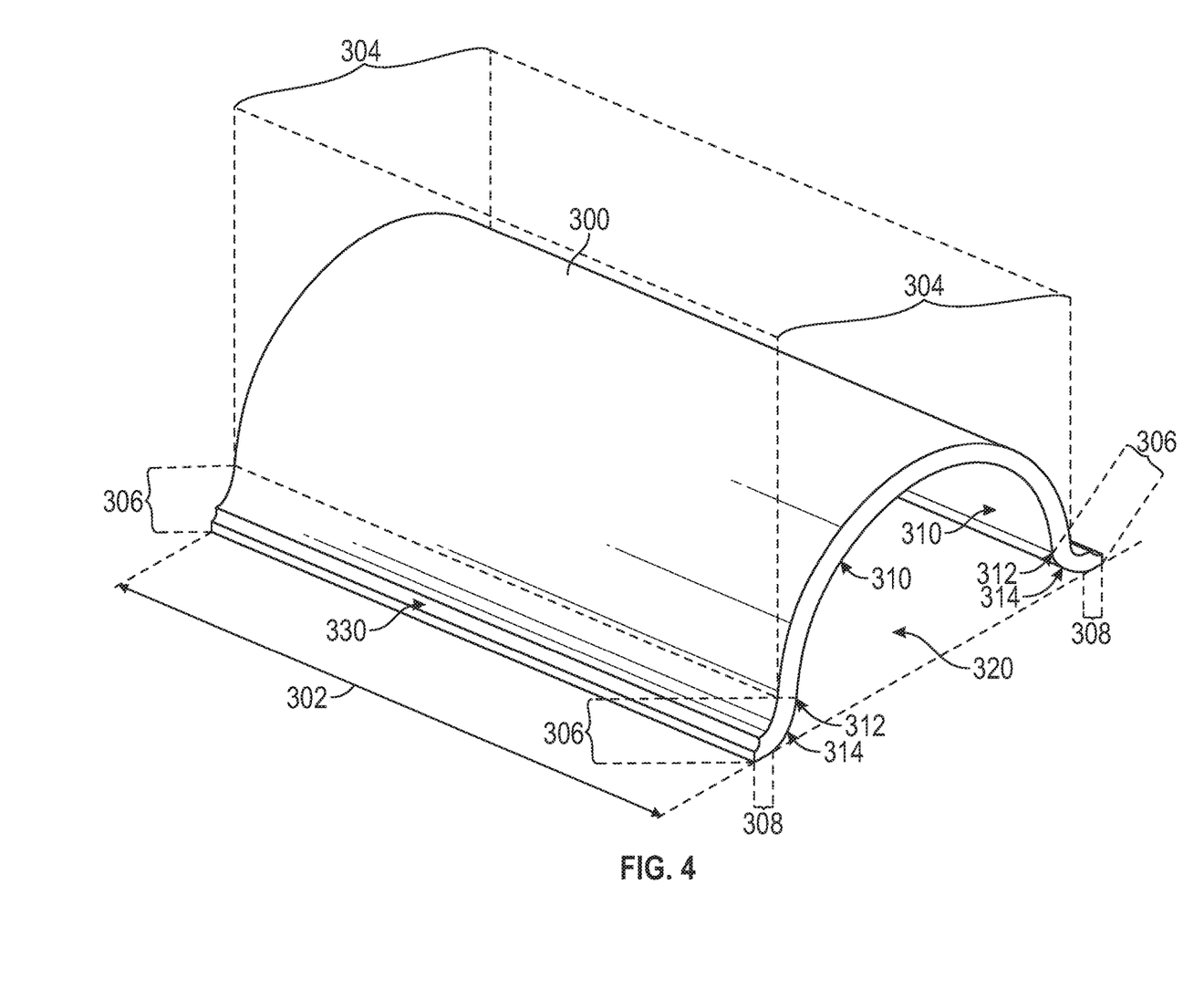
FIG. 4 is a partial perspective view of a length of conduit for use on a jacketed vessel in accordance with the present disclosure.

FIG. 4 shows a partial view of a length 302 of conduit 300 separate from the vessel 100 before being integrally attached to the vessel shell 105 during manufacturing of the vessel 100. FIG. 3 illustrates a partial view of a length 302 of conduit 300 positioned abutting a vessel shell 105 so that the conduit may be integrally attached to a portion of a vessel shell 105. As used herein, the term "conduit" refers to an elongated structure shaped to form a passageway for conveying fluid but that is open lengthwise on one side of the structure so that the open side of the structure may be positioned against a second structure, which is a vessel shell 105, to form the passageway between the two structures. As used herein, the term "integrally attached" means that the conduit 300 is attached to the vessel shell 105 lengthwise along a length 302 of conduit 300 so that fluid cannot leak through lengthwise attachment points and that the conduit 300, once attached, cannot be detached from the vessel shell 105 without causing permanent damage to the conduit 300 or to the shell 105. The conduit 300 is preferably integrally attached to the shell 105 by a welding joint. FIGS. 3 and 4 show only a partial length 302 of conduit 300 and a partial segment of vessel shell 105 to illustrate the general shape of the conduit 300. It should be understood that the length 302 of conduit 300 extends from an inlet 112 to an outlet 114 for heating or cooling fluid, typically in multiple 360-degree arcs around a vessel shell 105, and that the length 302 (or the number of 360-degree arcs) is determined by the design specifications of the vessel 100. The jacket 110 may comprise a single length of conduit 300 or may comprise a plurality of lengths 302 of conduit (with separate inlets 112 and outlets 114) that form separate heating or cooling zones, as shown in FIG. 1. Because only a relatively short length is shown in FIGS. 3 and 4, for ease of illustration, the conduit 300 and shell 105 are shown as being generally straight, though the shell 105 is preferably curved and the conduit 300 is shaped to fit against the shell 105 so that the conduit may be integrally attached to the shell.

Figure 6:
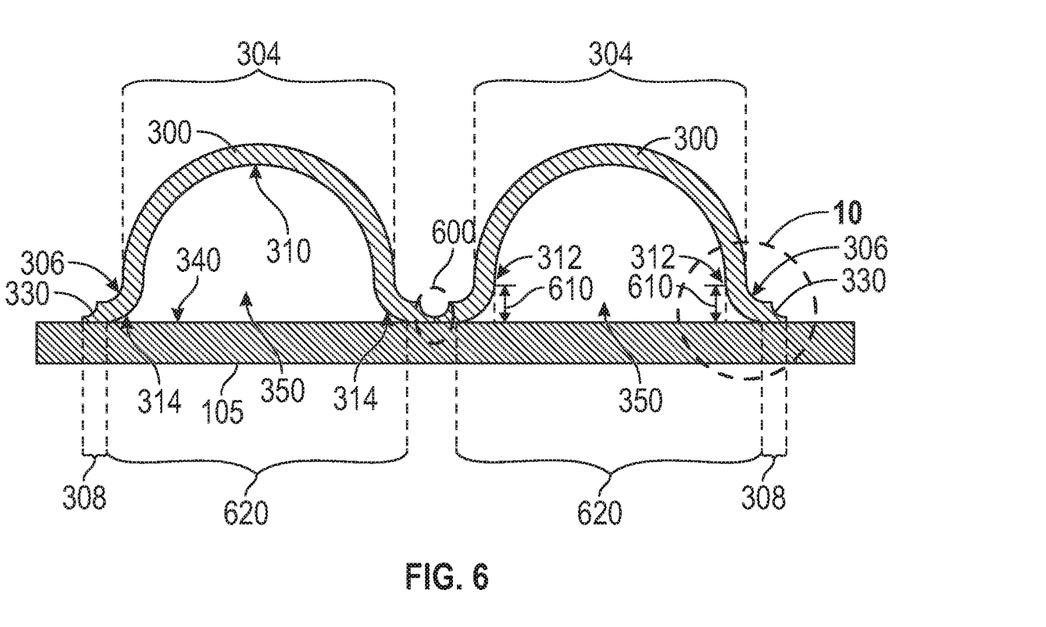
FIG. 6 is a partial cross-sectional view of adjacent arcs of jacket conduit positioned abutting a vessel shell prior to attachment to the shell in accordance with the present disclosure.
Figure 9:
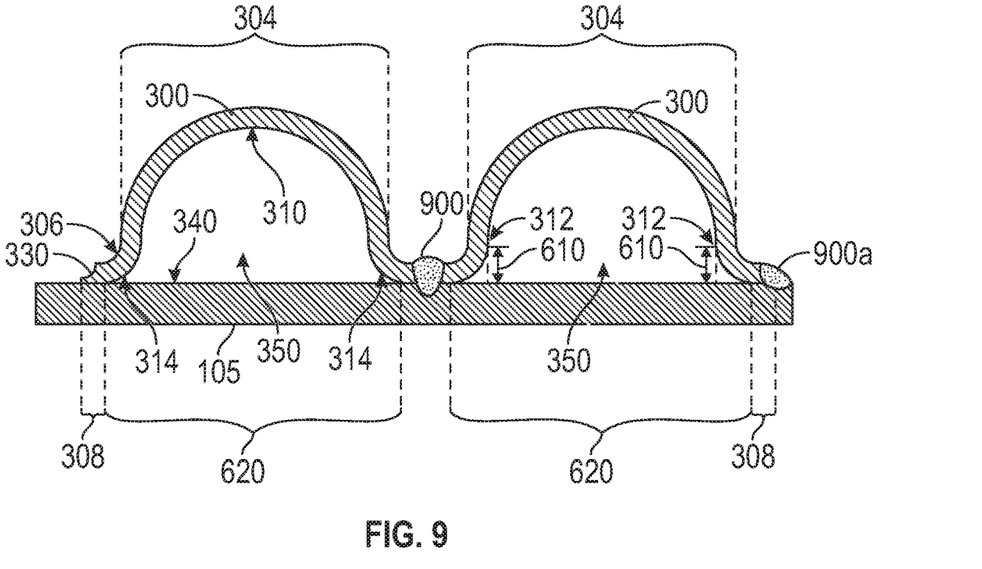
FIG. 9 is a partial cross-sectional view of adjacent arcs of jacket conduit integrally attached to a vessel shell in accordance with the present disclosure.

As shown in FIG. 4, the conduit 300 comprises a center portion 304 that extends lengthwise along the length 302 of the conduit 300 and that has a concave inner surface 310. The conduit 300 further comprises two opposing side portions 306 each integrally formed lengthwise with the center portion 304 and each having a convex inner surface 314 that is continuous with the concave inner surface 310 of the center portion 304. Thus, the opposing side portions 306 spread outwardly from the center portion 304 so that a transverse cross-section of the conduit 300 has a shape similar to the shape of a bell curve in that the conduit 300 has a concave center portion 304 and two opposing convex side portions 306, as best seen in FIGS. 4, 6, and 9. The center portion 304 of the conduit 300 preferably has a cross-sectional shape of a circular segment, which is preferably a semicircular segment, as best seen in FIGS. 6 and 9. A cross-sectional shape of a semicircle or smaller circular segment generally provides a jacket with good fatigue resistance. However, the center portion 304 may have other cross-sectional shapes that have a concave inner surface 310, such as a parabolic shape or the shape of the concave portion of a bell, or Gaussian, curve. The cross-sectional shape of the conduit 300 is preferably symmetrical.

Figure 10:
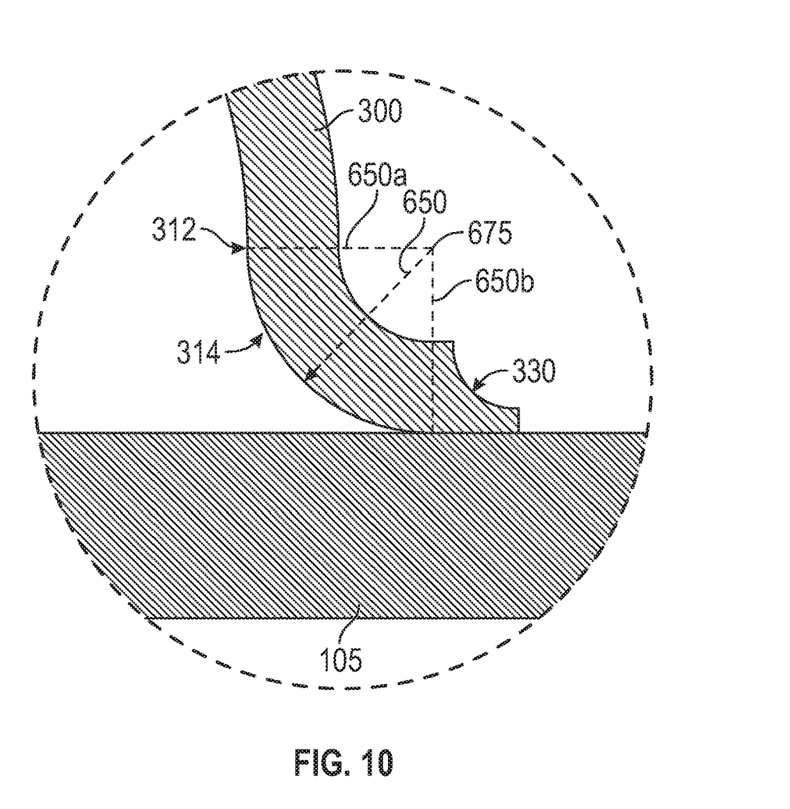
FIG. 10 is a cross-sectional partial view of an arc of jacket conduit shown in FIG. 6.

The opposing side portions 306 include two opposing edge sections 308 along the length 302 of the conduit 300 at the edges of the side portions 306, as shown in FIG. 4. Each of the opposing edge sections 308 forms an outer edge along the opposing side portions 306 of the conduit 300. At least a portion of each edge section 308 of the conduit 300 is integrally attached to the exterior surface 340 of the shell 105, preferably by a welding joint 900, to form the attachment of the jacket 110 to the vessel shell 105, as shown in FIG. 9. The edge sections 308 of the conduit 300 are arranged so that each edge section 308 lays flush against the exterior surface 340 of the shell 105 when the conduit 300 is positioned abutting the shell 105, as best seen in FIGS. 6 and 10, to facilitate attachment to the shell 105. Thus, the edge section 308 of each side portion 306 is the part of the side portion 306 that directly contacts the vessel shell 105 for attachment to the shell 105. Each edge section 308 preferably has a width, as indicated by the width of brackets 308 shown in FIG. 6, that is at least half the thickness of the conduit 300 wall to provide sufficient area for attaching the edge sections 308 to the vessel shell 105 with a welding joint. The width of the edge sections 308 may be varied to adjust the distance between center portions 304 of adjacent arcs of conduit 300, depending on vessel 100 specifications.

Once the edge sections 308 are attached to the vessel shell 105, the concave 310 and convex 314 inner surfaces of the conduit 300 and the exterior surface 340 of the shell 105 form a passageway 350 that is enclosed lengthwise along the length 302 of the conduit 300. The passageway 350 is open at two opposing ends to allow heating or cooling fluid to flow through the passageway 350 for temperature control of the vessel contents. The opposing open ends of the passageway 350 are defined by an inlet 112 and an outlet 114 for heating or cooling fluid to flow into and out of the passageway 350 from a source external to the vessel 100. The jacket 110 may comprise multiple temperature-control zones each defined by a length 302 of conduit 300. For instance, a heating or cooling fluid may flow into inlet 112a and out of outlet 114a, as shown in FIG. 1. The length of conduit 300 between inlet 112a and outlet 114a forms a first temperature-control zone. A second flow of heating or cooling fluid, which may be the same or a different fluid form the first flow, may flow into inlet 112b and out of outlet 114b, which forms a second temperature-control zone. Such an arrangement allows greater flexibility in temperature control of the vessel contents.

To provide adequate temperature control, each length 302 of spirally oriented conduit 300 may comprise multiple 360-degree arcs. FIG. 9 shows a partial cross-sectional view of two adjacent arcs of conduit 300 integrally attached to the vessel shell 105 by a welding joint 900. Due to the jacket conduit 300 geometry, the convex inner surface 314 of each side portion 306 may be tangential to the exterior surface 340 of the shell 105 when the conduit 300 is attached to the vessel shell 105, as shown in FIG. 9. The conduit 300 may have a curved transition between the concave inner surface 310 of the center portion 304 and the convex inner surface 314 of each side portion 306 at an inflection point 312, as best seen in FIG. 4. Preferably, each inflection point 312 is located at a distance 610 from the exterior surface 340 of the shell 105, as shown in FIG. 9, sufficient to form a cross-sectional area of the passageway 350 that is at least 4% greater than a cross-sectional area defined by the concave inner surface 310 of the center portion 304 and a transverse line having end points at each inflection point 312. Additionally, the edge sections 308 of the opposing side portions 306 are preferably positioned to form a heat transfer area having a width 620 that is at least 7% longer than a transverse line having end points at each inflection point 312. The heat transfer area is an area of the exterior surface 340 of the shell 105 that defines a part of the passageway 350 over which heating or cooling fluid flows to cause heat transfer. The heat transfer area is thus the area of the exterior surface 340 of the vessel shell 105 located between the attachment points of each of the opposing edge sections 308 along the length 302 of conduit 300. The present conduit geometry may also form a passageway 350 having a hydraulic diameter that is larger than a hydraulic diameter of a cross-sectional area defined by the concave inner surface 310 of the center portion 304 and a transverse line having end points at each inflection point 312.

FIG. 10 shows a detailed view of a portion of conduit 300, including one side portion 306, shown in FIG. 6. As shown in FIG. 10, the convex inner surface 314 of each side portion 306 of the conduit 300 may have a shape of a circular segment having a radius 650 measured from a point 675 exterior to the conduit passageway 350. The radius 650 is any line segment of equal length measured from point 675 to the convex inner surface 314 of a side portion 306 of conduit 300 within a 90-degree quadrant from a horizontal radius line 650a to a vertical radius line 650b. The radius 650 preferably has a length that is at least 3.5% of the length of a transverse line having end points at each inflection point 312, which is the internal diameter of the conduit 300. This minimum radius length provides side portions 306 that form a volume of space lengthwise within the passageway 350 between the convex inner surface 314 of each of the side portions 306 and the exterior surface 340 of the shell 105 located directly below each side portion 306. This volume of space is defined by the convex inner surface 314 of one side portion 306, a line extending from an inflection point 312 perpendicularly to the exterior surface 340 of the shell 105, and a portion of the exterior surface 340 of the shell 105 located between the perpendicular line and the edge section 308 of the side portion 306. Thus, a volume of space extends lengthwise along each side of the conduit 300 under each opposing side portion 306. The minimum radius 650 length of the side portions 306 and the geometric shape of the conduit 300 form a volume of space under each side portion 306 that has a shape that causes increased turbulence in the flow of heating or cooling fluid flowing within this volume of space. The increased turbulence within this volume of space improves heat transfer in the portion of the heat transfer area under each side portion 306 of the conduit 300. Further, the minimum radius length provides a volume of space that is of sufficient volume to produce a sufficient amount of turbulence to effectively improve heat transfer between fluid flowing through the passageway 350 and the vessel shell 105.

To optimize the performance of the vessel jacket 110, the radius 650 preferably has a minimum length of ¼ inch for vessels 100 having small diameter conduit 300 (with a conduit 300 wall thickness of ⅛ inch). For larger vessels 100, the length of the radius 650 may be substantially greater to maximize effectiveness, depending on the vessel size and conduit size. The radius 650 length cannot exceed the length of an outside diameter of the center portion 304 of the conduit 300, as indicated by the width of bracket 304 shown in FIG. 6.

Figure 5:
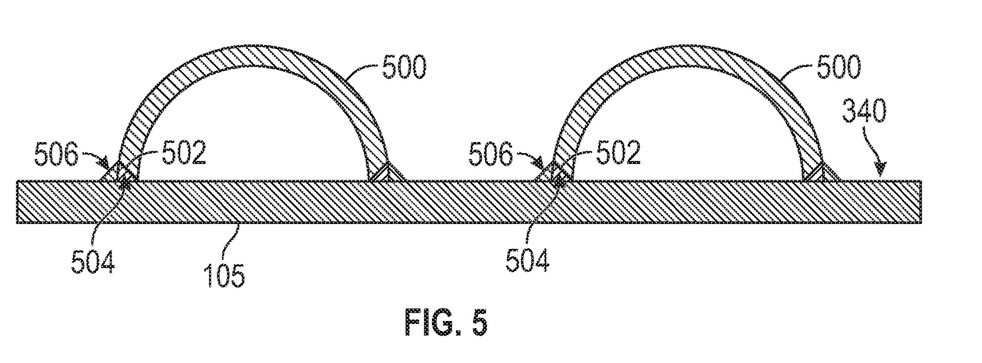
FIG. 5 is a partial cross-sectional view of a conventional half-pipe design having a semi-circular cross section welded to a vessel shell.

The cross-sectional geometry of the present conduit 300 provides a larger surface area for heat transfer between the heating or cooling fluid and the vessel shell 105 for each pass of the spirally oriented jacket conduit 300, as compared to a conventional half-pipe jacket design utilizing a semi-circular half-pipe 500, such as the design shown in FIG. 5, having the same internal diameter as the center portion 304 of the present conduit 300, which preferably has a semicircular, or half-pipe, shape. The internal diameter, as used herein, of the conduit 300 is measured transversely across the conduit between opposing inflection points 312. In addition, the present conduit geometry also provides a larger cross-sectional area of the passageway 350 formed by the conduit 300 and the vessel shell 105, as compared to a conventional half-pipe jacket 500 having the same internal diameter as the center portion 304 of the present conduit 300. This design of jacket conduit 300 results in improved pressure drop characteristics of the heating or cooling fluid circulating through the jacket and improved heat transfer and temperature control. In addition, a continuous curved concave-to-convex geometry of the jacket conduit provides increased fatigue resistance as compared to a conventional half-pipe jacket 500.

To illustrate the improved heat transfer and pressure drop characteristics of the present conduit 300 design relative to a conventional half-pipe 500 jacket, simulations were performed at varying flow rates of fluid through the conduit 300 of the vessel jacket 110. The simulations were performed with computational fluid dynamics simulation software ANSYS R19.1 using CFX. An SST (Menter's Shear Stress Transport) turbulence model was utilized. The simulation was based on 40° Fahrenheit (F) cooling water flowing through the conduit 300 of the vessel jacket 110 and a vessel 100 operating at 200° F. The cooling water flow rate was varied to analyze performance as a function of flow rate. The vessel shell wall boundary condition was assumed to have a wall heat transfer coefficient of 175 BTU/hour*foot$^2$*° F. at a reference temperature of 200° F. This coefficient was selected as an approximation for a convection coefficient inside of a vessel. The cooling water inlet was set to a defined flow rate, and the inlet pressure required to generate that flow rate was computed. The cooling water outlet was set at a pressure of 0 psig as a reference to determine pressure drop. The outside of the jacket was assumed to be adiabatic. The total length 302 of the computed jacket conduit 300 is 10 feet. The heat flux is calculated over the entire width 620 of the heat transfer area, but only over the final 25% of the length 302, which assists in fully developing fluid flow before measuring heat transfer.

Tables 1 and 2 below show the results of the simulation for a conventional half-pipe jacket and for the present jacket, respectively. In the simulation, the conventional jacket 500 had an internal diameter of three inches, a conduit wall thickness of ¼ inch, and an outside diameter of 3.5 inches. The present design of jacket conduit 300 had an internal diameter of three inches (measured between inflection points 312), a conduit wall thickness of ¼ inch, an outside diameter of 3.5 inches, and a radius of ½ inch for the convex inner surface 314 of each side portion 306.

TABLE 1

Results for conventional design of half-pipe jacket 500.

| Flow Rate | Heat Flux | Pressure Drop | Outlet Temperature | Delta T | Total Heat Transferred |
|---|---|---|---|---|---|
| 5 | 2.74 | 0.0028 | 57.3 | 17.3 | 729 |
| 50 | 4.28 | 0.1555 | 43.2 | 3.2 | 1,350 |
| 200 | 4.89 | 1.88 | 40.9 | 0.9 | 1,520 |

TABLE 2

Results for present design of jacket conduit 300.

| Flow Rate | Heat Flux | Pressure Drop | Outlet Temperature | Delta T | Total Heat Transferred |
|---|---|---|---|---|---|
| 5 | 1.83 | 0.0018 | 57.9 | 17.9 | 754 |
| 50 | 4.45 | 0.0638 | 43.7 | 3.7 | 1,560 |
| 200 | 5.60 | 0.781 | 41.1 | 1.1 | 1,850 |

The unit of measurement for the values shown in Tables 1 and 2 are as follows: flow rate is in gallons per minute; heat flux is in BTU/(second*foot$^2$); pressure drop is in pounds per square inch (psi); outlet temperature and delta T are in degrees Fahrenheit; and total heat transferred is in BTU/minute.

TABLE 3

Percentage change for present design of jacket conduit 300 compared to conventional design of half-pipe jacket 500.

| Flow Rate (GPM) | Pressure Drop (%) | Heat Rate (%) |
|---|---|---|
| 5 | −35.71% | 3.47% |
| 50 | −58.97% | 15.63% |
| 200 | −58.46% | 22.22% |

Table 3 shows a summary of the results shown in Tables 1 and 2. As illustrated by the simulation results, the present design of jacket conduit 300 provides a decrease in pressure drop and an increase in total heat transfer rate when compared to a conventional half-pipe 500 jacket having only a semicircular segment of the same internal diameter as the center portion 304 of the present conduit 300, with the semicircular half-pipe 500 welded directly to a vessel shell without convex side portions 306 extending outwardly from the circular segment. The shape of the convex side portions 306 results in greater turbulence in the flow of heating or cooling fluid near the conduit-to-shell junction, which produces high local Reynolds numbers in the fluid flowing in the portions of the passageway 350 between each of the side portions 306 and the exterior surface 340 of the vessel shell 105. The turbulent flow results in high localized heat transfer coefficients in the portion of the heat transfer area defined by the portions of the shell 105 that are under each of the side portions 306, which is reflected in the heat flux data presented in Tables 1 and 2, particularly at higher flow rates of heating or cooling fluid. In addition, the heating or cooling fluid causes the temperature of the conduit 300 wall itself to change, which results in conductive heat transfer between the wall of the conduit 300 itself and the vessel shell 105 at the conduit-to-shell junction. Due to turbulent flow near the conduit-to-shell junction, the rate of conductive heat transfer between the conduit 300 and the shell 105 increases in the present design. Thus, the design characteristics of the present conduit 300 improve overall heat transfer compared to a conventional jacket design. Furthermore, the cross-sectional area of the flow passageway provided by the cross-sectional shape minimizes pressure drop compared to a conventional jacket design having the same internal diameter.

Figure 8:
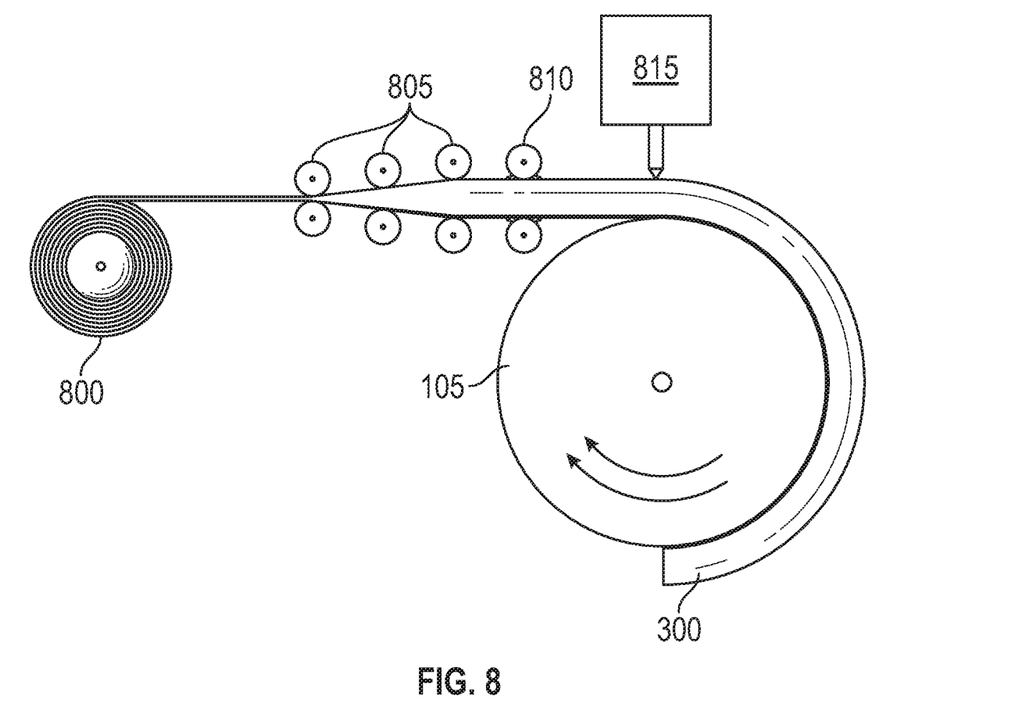
FIG. 8 is a schematic diagram of a method for manufacturing a jacketed vessel in accordance with the present disclosure.

FIG. 8 illustrates a process of manufacturing the present jacketed vessel 100. During the manufacturing process, a plurality of 360-degree arcs of conduit 300 are continuously welded to the exterior surface 340 of the vessel shell 105. Before being welded to the vessel shell 105, the edge sections 308 of the conduit 300 are positioned so that the edge sections 308 abut and generally lay flush against the exterior surface 340 of the shell 105, as shown in FIGS. 3 and 6, due to the shape of the conduit 300 having side portions 306 spreading outwardly from the center portion 304. This cross-sectional geometry allows an edge section 308 on one side of an arc of conduit 300 to be positioned adjacent to and in the same plane as an edge section 308 on an opposing side of an adjacent arc of conduit 300 when the adjacent edge sections 308 are in a position abutting the exterior surface 340 of the vessel shell 105, as shown in FIG. 6. When in the same plane, a welding joint 900 formed by a single pass, full-penetration butt weld may be utilized to integrally attach the adjacent edge sections 308 of adjacent arcs of conduit 300 to the vessel shell 105 and to each other, as shown in FIG. 9. Thus, a single pass, full-penetration butt weld may be utilized to form a single welding joint 900 that joins each of two edge sections 308 of conduit 300 to the vessel shell 105 and to each other, rather than requiring two or more weld passes to individually join two separate edges of conduit to a vessel shell. The cross-sectional geometry of the present jacket conduit 300 provides spacing between center portions 304 of adjacent arcs of conduit 300, as shown in FIGS. 6 and 9, which provides clearance necessary for performing a single pass butt weld to form a single welding joint to join adjacent arcs of conduit to the shell.

Each edge section 308 of the conduit 300 preferably has a beveled edge 330 extending along the length 302 of the conduit 300. As best seen in FIGS. 4 and 6, the beveled edge 330 of each edge section 308 preferably has a J-bevel. When an edge section 308 of one arc of conduit 300 is positioned adjacent to an edge section 308 of an adjacent arc of conduit 300, two adjacent J-bevels may form a single U-joint 600, as shown in FIG. 6, which provides a location for the welding joint 900. The welding joint 900 is preferably a single pass, full-penetration butt weld, which may provide a stronger weld while requiring less filler material. Alternatively, each edge section 308 may have a V-bevel so that adjacent edge sections 308 form a single V-joint. Alternatively, only one edge section 308 on one side of a length of conduit 300 may be beveled, or neither edge section may be beveled so that adjacent edge sections 308 form a square or closed square butt joint.

To perform the present method, first a vessel shell 105 having an exterior surface 340 is provided. The vessel shell 105 may be constructed by any known method suitable for constructing a vessel and may be pressure rated in accordance with operating specifications. In addition, a length 302 of conduit 300 is provided to form the jacket 110 of the vessel. A plurality of lengths 302 of conduit 300 may be provided if the vessel jacket 110 is to have multiple heating or cooling zones. Both the shell 105 and the conduit 300 are constructed of weldable material, such as a metal, metal alloy, or thermoplastic. Preferably, the construction material may be steel. The material of construction of both the shell 105 and the conduit 300 may be selected based on weldability as well as on the intended application, including consideration of the process-side and jacket-side fluids that will flow through the shell 105 and the jacket 110, respectively. The length 302 of conduit 300 has a concave center portion 304 and convex opposing side portions 306, each including edge sections 308 along the length 302 of the conduit 300, as described herein and as shown in FIG. 4. The length 302 of conduit 300 is open lengthwise along one side 320, as shown in FIG. 4. The open side 320 of the conduit 300 is placed in a position facing the exterior surface 340 of the shell 105, as shown in FIG. 6, so that the edge sections 308 of the conduit 300 may be welded to the shell 105. The final step is to weld the edge sections 308 of the conduit 300 to the shell 105 along the length 302 of the conduit 300 in a spiral orientation to form a welding joint 900 at which the edge sections 308 are integrally attached to the shell 105. Once welded, both the concave 310 and convex 314 inner surfaces of the conduit 300 and the exterior surface 340 of the shell 105 form a passageway 350 that is enclosed lengthwise along the length 302 of the conduit 300. The passageway 350 is open at two opposing ends to allow fluid flow through the passageway 350 to facilitate heat transfer for heating or cooling the contents of the vessel 100. Any suitable fluid for heating or cooling may be utilized, such as cooling water. The open ends of the passageway 350 may have an inlet 112 and an outlet 114, as shown in FIG. 1, which may be welded to the ends of the conduit 300, for connecting lines for heating or cooling fluid from an external source.

FIG. 8 illustrates a continuous process of welding conduit 300 to a vessel shell 105 to manufacture the present jacketed vessel 100. The process may be fully automated to produce a jacketed vessel 100 in a time-efficient and cost-effective manner. In accordance with a preferred manufacturing method, as shown in FIG. 8, the step of providing a length 302 of conduit 300 may comprise the steps of providing a strip 800 of weldable material and using rotary forming dies 805 to form the strip 800 into the length 302 of conduit 300 having a shape as shown in FIG. 4. The strip 800 is a generally flat piece of weldable material and may be formed into a roll 800 for the purposes of shipping and storage, as illustrated in FIG. 8. The roll 800 may form a single length 302 of conduit 300 or may be cut as needed to form multiple lengths of conduit. The roll 800 of material may be unrolled continuously as the material is fed to the rotary forming dies 805 to form the strip 800 into a length 302 of conduit 300. The rotary forming dies 805 are configured to form conduit 300 having the required shape. After passing through the rotary forming dies 805, the formed conduit 300 may then pass through a rotary cutter 810 to form a profiled, or beveled, edge 330 on each opposing edge section 308 of the conduit 300. Preferably, the rotary cutter 810 is configured to form a J-bevel on each edge section 308 so that two adjacent J-bevels of the edge sections 308 of adjacent arcs of conduit 300 may form a single U-joint 600, as indicated within the dotted lines shown in FIG. 6.

To weld the conduit 300 to the shell 105 in a continuous process, the vessel shell 105 may be continuously rotated while welding. In addition, the rotary dies 805 may be utilized to continuously form the strip 800 of weldable material into the length 302 of conduit 300 while simultaneously rotating the vessel shell 105 during the process of welding the edge sections 308 of the conduit 300 to the shell 105. An automatic or semi-automatic submerged arc welder 815 may be utilized to continuously weld the edge sections 308 of the conduit 300 to the vessel shell 105 to form a continuous welding joint 900 along the length 302 of the conduit. Alternatively, any suitable automatic, semi-automatic, or manual welding method may be utilized.

The welding process may comprise welding multiple 360-degree arcs of conduit 300 to the vessel shell 105 beginning at one end of the shell 105 and welding a plurality of arcs to the exterior surface 340 of the shell 105 in a spiral orientation until a desired surface area of the shell 105 is covered by the jacket 110. For instance, as shown in FIG. 1, a first 360-degree arc 300a may be welded to the shell 105 beginning at a top end of the shell 105. Next, a second 360-degree arc 300b may be welded to the shell 105 adjacent to the first arc 300a, and a third 360-degree arc 300c may be welded to the shell 105 adjacent to the second arc 300b, and so on. Thus, when arranged in such a spiral orientation, a bottom edge section 308 of arc 300a is positioned adjacent to a top edge section 308 of arc 300b, and a bottom edge section 308 of arc 300b is positioned adjacent to a top edge section 308 of arc 300c, and so on, as shown in FIG. 1. FIG. 6 illustrates two edge sections 308 of adjacent arcs of conduit 300 positioned adjacent to each other in a suitable position for welding at welding joint location 600, and FIG. 9 illustrates the edge sections 308 of adjacent arcs joined to the shell 105 and to each other by a welding joint 900. A top edge section 308 of arc 300a is not adjacent to another edge section because arc 300a forms an end arc of the vessel jacket 110.

The first arc 300a may be welded to the shell 105 continuously while rotating the shell 105. When initially welding the first arc 300a, only the top edge section 308 is welded to the shell 105 because initially there is no adjacent arc of conduit 300 and thus only a single edge section 308 to weld. To weld only one edge section 308 to the shell 105, a lap joint may be formed between a single edge section 308 and the shell 105, which are in a lapping pattern relative to each other. FIG. 9 (right side) shows a lap joint 900a joining only one edge section 308 of an end arc of conduit 300 to the shell 105. Once the top edge section 308 of a 360-degree portion of the length 302 of conduit 300 has been welded to the shell to integrally attach the top edge section 308 of the first arc 300a to the shell 105, welding is continued along the length 302 of conduit 300 as the conduit is continuously positioned against the exterior surface 340 of the shell 105 to weld the second 360-degree arc 300b to the shell 105 adjacent to the first arc 300a. During this portion of the welding process, both the bottom edge section 308 of the first arc 300a and the top edge section 308 of the second arc 300b may be welded simultaneously to form the welding joint 900 in a single weld pass. The welding process is then continued to weld the third 360-degree arc 300c to the shell 105 adjacent to the second arc 300b, and so on. During this portion of the welding process, both the bottom edge section 308 of the second arc 300b and the top edge section 308 of the third arc 300c may be welded simultaneously to form a welding joint 900 in a single weld pass. Thus, a single, continuous, spiraling welding joint 900 may join an entire length 302 of multiple arcs of conduit 300 to the vessel shell 105 in a single weld pass. Each 360-degree arc of the welding joint 900 joins an edge section 308 of one arc of conduit to both an opposing edge section 308 of an adjacent arc of conduit 300 and to the vessel shell 105. Thus, the welding joint 900 continuously joins each of two edge sections 308 to the vessel shell 105 and to each other, with the wall of the shell 105 functioning in a manner similar to a backing strip to the butt weld joining the edge sections 308 to each other.

When one of the edge sections 308 of the conduit 300 having a beveled edge 330 is positioned abutting the vessel shell 105 for welding, a bevel joint may be formed for welding the edge section 308 to the shell 105. When the beveled edge 330 of each edge section 308 has a J-bevel, a U-joint 600 may be formed by J-bevels of adjacent arcs of conduit 300, as shown in FIG. 6. A single pass, full-penetration butt weld may then be performed at the U-joint 600 to form a single welding joint 900 that integrally attaches two edge sections 308 of adjacent arcs of conduit 300 to the shell 105 with a single weld pass. Utilizing a full-penetration butt weld for the welding joint 900 may increase the structural integrity of the jacket 110 to shell 105 joint, which may prolong the life of the jacketed vessel 100.

Due to the geometry of the conduit 300 with side portions 306 spreading outwardly from the center portion 304, edge sections 308 of adjacent arcs of conduit 300 may be welded to the shell in a single pass while providing spacing between center portions 304 of the adjacent arcs of conduit 300, as shown in FIGS. 6 and 9. This spacing provides necessary clearance for performing a single pass butt weld to form the welding joint 900 that integrally attaches adjacent arcs of conduit 300 to the shell 105. FIG. 5 shows a cross-sectional view of two adjacent arcs of conduit 500 of a conventionally manufactured half-pipe jacket. Each arc of conduit 500 may have beveled edges 502 for welding the conduit 500 to the exterior surface 340 of the shell 105. To manufacture the vessel, each arc of conduit 500 is welded individually to the shell 105 along each of the beveled edges 502. A first weld pass 504 attaches the conduit 500 to the shell 105. The first pass 504 may sometimes be followed by a second weld pass 506 to increase the strength of the welding joint. Thus, at least two, and sometimes four, weld passes are performed for a length of conduit 500 when manufacturing a conventional half-pipe jacketed vessel, whereas the present jacketed vessel 100 may be manufactured by a welding process performed with a single weld pass for a length 302 of conduit 300. Thus, the present manufacturing process significantly reduces the required amount of welding, which reduces production costs of the vessel 100. In addition, the present method allows a full-penetration butt weld to be performed because adjacent edge sections 308 of adjacent arcs of conduit 300 may be placed in the same plane, as shown in FIG. 6, which is not possible with a conventional jacket 500 that typically utilizes a continuous fillet welding joint to join each side of the half-pipe 500 to the vessel shell. A jacket 110 welded with a full-penetration butt weld provides an advantage over conventionally welded jackets 500 because this type of weld generally provides higher joint efficiency and increased fatigue resistance of the jacket-to-shell weld 900 as it reduces the possibility of a stress riser from a notch discontinuity.

An additional advantage of the present design of jacket 110 is that it covers a greater surface area of the exterior surface 340 of the vessel shell 105 than a conventional jacket 500, which provides increased heating or cooling efficiency due to the larger surface area for heat transfer. As shown in FIG. 5, a conventional jacket has spacing between arcs of conduit 500 to provide clearance for welding operations when manufacturing the vessel. Thus, the surface area of the shell 105 located between arcs of conduit 500 cannot be utilized for heat transfer. As shown in FIGS. 6 and 9, the jacket conduit 300 of the present vessel 100 may cover the entire exterior surface 340 of the vessel shell 105, including the heat transfer area 620 and the edge sections 308 welded to the shell 105. This shell coverage is possible due to the present conduit geometry, which allows the edge sections 308 of adjacent arcs of conduit 300 to be positioned directly adjacent to each other, rather than spaced apart as in a conventional jacket conduit 500, while still providing adequate clearance between arcs of conduit for welding operations. Thus, the present design of conduit 300 allows heat transfer to occur between the heating or cooling fluid and the vessel shell 105, as well as between the conduit 300 itself and the shell 105, over the entire vessel surface area covered by the jacket 110. Accordingly, full shell 105 coverage as provided by the present conduit design, in combination with the geometry of the conduit 300, provide a cumulative advantage in terms of heating and cooling efficiency over the entire jacket shell as compared to conventional jacket conduit 500 utilizing conventional spacing.

An additional advantage of the present jacketed vessel 100 is that the cross-sectional geometry of the jacket conduit 300 provides the ability to perform 100% radiography or ultrasonic inspections of welding joints 900. To perform radiography testing, a source of radiation may be positioned over the butt weld 900 between arcs of conduit 300 and a detecting device such as X-ray film may be positioned under the butt weld 900 in the interior of the vessel 100. Similarly, to perform ultrasonic testing (UT), a UT probe may be positioned directly over the butt weld 900 between arcs of conduit 300. Both types of testing are possible due to the type of weld and the weld joint geometry with a single weld 900 positioned between arcs of conduit 300.

Figure 7:
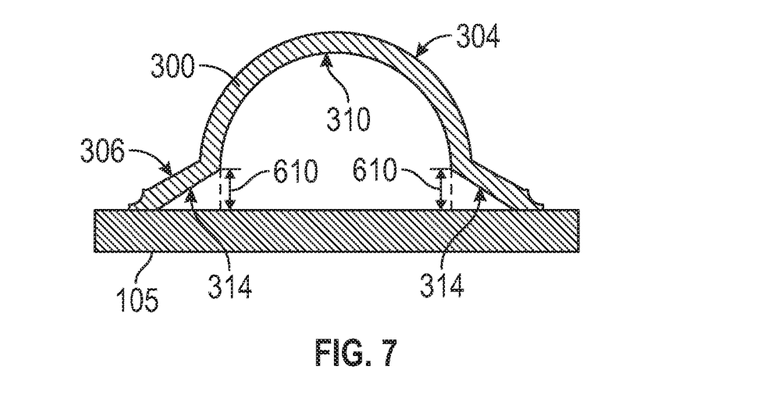
FIG. 7 is a partial cross-sectional view of an alternative embodiment of a jacket conduit in accordance with the present disclosure.

FIG. 7 shows an alternative design of conduit 300 in which the side portions 306 are angled outwardly rather than having a curved transition between the concave inner surface 310 of the center portion 304 and the convex inner surface 314 of the side portions 306. In this embodiment, the convex inner surface 314 of each side portion 306 may be defined by a generally straight, non-curved section between each of the inflection points 312 and their respective edge sections 308. This geometry provides the same heat transfer, pressure drop, and manufacturing advantages, though a curved transition between the center and side portions may provide increased fatigue resistance for the conduit. In other alternative designs, the concave inner surface 310 of the center portion 304 may have a shape other than the shape of a circular segment, such as a concave polygonal shape with angled inner surface segments.

The implementations set forth in the foregoing description do not represent all implementations consistent with the subject matter described herein but are examples consistent with the disclosed subject matter. Although variations have been described in detail above, other modifications or additions may be possible. It is understood that one of skill in the art would appreciate these various implementations and variations as falling within the scope of the present disclosure.

What is claimed is:

1. A jacketed vessel for temperature control of contents within the vessel, said vessel comprising:
   a vessel shell having an exterior surface, and
   a jacket comprising a length of conduit having a center portion that extends along the length of the conduit, wherein the center portion has a concave inner surface, and two opposing side portions each integrally formed lengthwise with the center portion, wherein each side portion has a convex inner surface that is continuous with the concave inner surface of the center portion, wherein the two opposing side portions include two opposing edge sections along the length of the conduit,
   wherein each of the edge sections of the conduit is integrally attached to the exterior surface of the shell along the length of the conduit, wherein the conduit is disposed in a spiral orientation relative to an axis of the shell, wherein both the concave and convex inner surfaces of the conduit and the exterior surface of the shell form a passageway that is enclosed along the length of the conduit, and wherein the passageway is open at two opposing ends to allow fluid flow through the passageway,
   wherein each of the edge sections of the conduit is integrally attached to the exterior surface of the shell by a welding joint, wherein the length of spirally oriented conduit comprises multiple 360-degree arcs, wherein the welding joint joins an edge section of one arc of conduit to both an opposing edge section of an adjacent arc of conduit and to the vessel shell, wherein each edge section of the conduit has a beveled edge, and wherein the welding joint is a bevel joint formed by the beveled edges of the opposing edge sections of the adjacent arcs of conduit.

2. The jacketed vessel of claim 1, wherein the center portion of the conduit has a cross-sectional shape of a circular segment.

3. The jacketed vessel of claim 1, wherein the conduit has a transition between the concave inner surface of the center portion and the convex inner surface of each side portion at an inflection point, wherein the edge sections of the opposing side portions are positioned to form a heat transfer area having a width that is at least 7% longer than a transverse line having end points at each inflection point, and wherein each inflection point is located at a distance from the exterior surface of the shell sufficient to form a cross-sectional area of the passageway that is at least 4% greater than a cross-sectional area defined by the concave inner surface of the center portion and a transverse line having end points at each inflection point.

4. The jacketed vessel of claim 1, wherein the conduit has a transition between the concave inner surface of the center portion and the convex inner surface of each side portion at an inflection point, wherein the convex inner surface of each side portion has a shape of a circular segment having a radius that has a length that is at least 3.5% of the length of a transverse line having end points at each inflection point.

5. The jacketed vessel of claim 1, wherein the convex inner surface of each side portion is tangential to the exterior surface of the shell.

6. The jacketed vessel of claim 1, wherein the welding joint is formed by a single weld pass.

7. A method of manufacturing a jacketed vessel for temperature control of contents within the vessel, said method comprising the steps of:
   providing a vessel shell constructed of weldable material and having an exterior surface;
   providing a length of conduit constructed of weldable material and open along one side of the length of conduit, wherein the length of conduit has a center portion that extends along the length of the conduit, wherein the center portion has a concave inner surface, and two opposing side portions each integrally formed lengthwise with the center portion, wherein each side portion has a convex inner surface that is continuous with the concave inner surface of the center portion, wherein the two opposing side portions include two opposing edge sections along the length of the conduit;
   welding each of the edge sections of the conduit to the shell along the length of the conduit in a spiral orientation to form a welding joint at which each edge section is integrally attached to the vessel shell, wherein both the concave and convex inner surfaces of the conduit and the exterior surface of the shell form a passageway that is enclosed along the length of the conduit, and wherein the passageway is open at two opposing ends to allow fluid flow through the passageway; and
   using a rotary cutter to form a beveled edge on each edge section of the conduit, wherein the step of welding each of the edge sections of the conduit to the shell comprises forming a bevel joint.

8. The method of claim 7, wherein the step of welding the edge sections of the conduit to the shell in a spiral orientation comprises welding multiple 360-degree arcs of conduit, wherein the welding joint formed by the welding step joins an edge section of one arc of conduit to both an opposing edge section of an adjacent arc of conduit and to the vessel shell.

9. The method of claim 8, wherein welding multiple 360-degree arcs of conduit comprises continuously rotating the vessel shell while welding, wherein the welding joint is formed by a single weld pass.

10. The method of claim 7, wherein the step of providing a length of conduit comprises the steps of providing a strip of weldable material and using rotary forming dies to form the strip into the length of conduit.

11. The method of claim 9, wherein the step of providing a length of conduit comprises the steps of providing a strip of weldable material and using rotary forming dies to continuously form the strip into the length of conduit while simultaneously rotating the vessel shell during the step of welding the edge sections of the conduit to the shell.

12. The method of claim 7, wherein the step of welding the edge sections of the conduit to the shell is done by submerged arc welding.

13. The method of claim 7, wherein the beveled edge of each edge section has a J-bevel, and the step of welding the edge sections of the conduit to the shell comprises the steps of forming a U-joint with J-bevels of adjacent arcs of conduit and welding multiple 360-degree arcs of conduit, wherein the welding joint formed by the welding step joins an edge section of one arc of conduit to both an opposing edge section of an adjacent arc of conduit and to the vessel shell.

14. The method of claim 7, wherein the center portion of the conduit has a cross-sectional shape of a circular segment.

15. The method of claim 7, wherein the conduit has a transition between the concave inner surface of the center portion and the convex inner surface of each side portion at an inflection point, wherein the edge sections of the opposing side portions are positioned to form a heat transfer area having a width that is at least 7% longer than a transverse line having end points at each inflection point, and wherein each inflection point is located at a distance from the exterior surface of the shell sufficient to form a cross-sectional area of the passageway that is at least 4% greater than a cross-sectional area defined by the concave inner surface of the center portion and a transverse line having end points at each inflection point.

16. The method of claim 7, wherein the conduit has a transition between the concave inner surface of the center portion and the convex inner surface of each side portion at an inflection point, wherein the convex inner surface of each side portion has a shape of a circular segment having a radius that has a length that is at least 3.5% of the length of a transverse line having end points at each inflection point.

* * * * *